US006331915B1

(12) United States Patent
Myers

(10) Patent No.: US 6,331,915 B1
(45) Date of Patent: Dec. 18, 2001

(54) LIGHTING ELEMENT INCLUDING LIGHT EMITTING DIODES, MICROPRISM SHEET, REFLECTOR, AND DIFFUSING AGENT

(75) Inventor: Kenneth J. Myers, 50 S. Buckhout St., Irvington, NY (US) 10533

(73) Assignees: Kenneth J. Myers; Edward Greenberg, both of Irvington, NY (US)

(*) Notice: Subject to any disclaimer, the term of this patent is extended or adjusted under 35 U.S.C. 154(b) by 0 days.

(21) Appl. No.: 09/592,913

(22) Filed: Jun. 13, 2000

(51) Int. Cl.[7] ................................ G02B 5/02; F21V 8/00

(52) U.S. Cl. ............................ 359/599; 359/831; 362/31

(58) Field of Search .................................... 359/599, 707, 359/831–837; 362/31, 26, 27; 349/56–71

(56) References Cited

U.S. PATENT DOCUMENTS

| | | | | |
|---|---|---|---|---|
| 2,881,686 | | 4/1959 | Ruhle | 359/455 |
| 2,909,770 | | 10/1959 | Pugsley | 359/601 |
| 3,279,340 | | 10/1966 | Ramberg et al. | 359/455 |
| 3,718,078 | | 2/1973 | Plummer | 359/599 |
| 3,902,787 | | 9/1975 | Sherlock | 359/456 |
| 3,971,051 | | 7/1976 | Baker et al. | 359/455 |
| 4,165,920 | | 8/1979 | Brown | 359/455 |
| 4,206,969 | | 6/1980 | Cobb et al. | 359/455 |
| 4,309,073 | | 1/1982 | Nishimura et al. | 359/455 |
| 4,309,074 | | 1/1982 | Granieri, Jr. | 359/609 |
| 4,333,707 | | 6/1982 | West | 359/462 |
| 4,708,435 | | 11/1987 | Yata et al. | 359/456 |
| 4,756,603 | | 7/1988 | Ohtani | 359/453 |
| 4,911,529 | | 3/1990 | Van De Ven | 359/453 |
| 4,996,632 | * | 2/1991 | Aikens | 359/599 |
| 4,998,804 | * | 3/1991 | Horiuchi | 349/64 |
| 5,143,433 | * | 9/1992 | Farrell | 349/68 |
| 5,208,620 | | 5/1993 | Mitsutake et al. | 353/74 |
| 5,316,359 | | 5/1994 | Lansinger | 296/70 |
| 5,317,405 | | 5/1994 | Kuriki et al. | 348/20 |
| 5,359,691 | | 10/1994 | Tai et al. | 355/146 |
| 5,363,237 | | 11/1994 | Wakatake | 349/64 |
| 5,446,594 | | 8/1995 | Nelson et al. | 359/742 |
| 5,512,219 | | 4/1996 | Rowland et al. | 264/16 |
| 5,584,556 | * | 12/1996 | Yokoyama et al. | 349/62 |
| 5,600,455 | * | 2/1997 | Ishikawa et al. | 349/64 |
| 5,729,387 | | 3/1998 | Takahashi et al. | 349/64 |
| 5,742,411 | | 4/1998 | Walters | 359/2 |
| 5,835,661 | | 11/1998 | Tai et al. | 349/64 |
| 5,836,096 | | 11/1998 | Brauer | 40/361 |
| 5,837,346 | | 11/1998 | Langille et al. | 428/141 |
| 5,860,722 | | 1/1999 | Tai et al. | 362/31 |
| 5,926,601 | | 7/1999 | Tai et al. | 385/146 |
| 5,986,728 | * | 11/1999 | Bernard | 349/84 |

FOREIGN PATENT DOCUMENTS

| | | | | |
|---|---|---|---|---|
| 5-34686 | * | 2/1993 | (JP) | 359/599 |
| 5-100223 | * | 4/1993 | (JP) | 359/599 |
| 6-51130 | * | 2/1994 | (JP) | 359/599 |

* cited by examiner

*Primary Examiner*—Thong Nguyen
(74) *Attorney, Agent, or Firm*—Bacon & Thomas

(57) ABSTRACT

A lighting element in which a plurality of point sources are in the form of LEDs situated between a microprism sheet and a reflective backing arrangement, the microprism sheet being of the type having a plurality of v-shaped grooves. The microprism sheet exhibits a diffusion effect, and the LEDs are situated in the grooves so that light from the LEDs that is directly incident on walls of the grooves, and light that is reflected by the backing, is combined by refraction and diffused to provide an even lighting effect. The lighting element may be made of flexible materials so that they can be formed into tubular lighting elements, or made into flat or curved panels.

10 Claims, 1 Drawing Sheet

LIGHTING ELEMENT INCLUDING LIGHT EMITTING DIODES, MICROPRISM SHEET, REFLECTOR, AND DIFFUSING AGENT

BACKGROUND OF THE INVENTION

1. Field of the Invention

This invention relates to a lighting element, and in particular to a wide-area lighting element in which the light is provided by a plurality of relatively small discrete light sources such as light emitting diodes (LEDs). The lighting element of the invention has relatively low power consumption, can be made in a number of different colors, is flexible so that it can be constructed in the form of a tube or attached to a curved surface, and yet provides a uniform light output similar to that provided by a fluorescent light.

The flexibility and light diffusion effect of the lighting element of the present invention both result from the inclusion of the microprism sheet, which may be made of a flexible resin material such as an acrylic or polyvinyl chloride, and which may either be provided with a diffusion coating or may otherwise be treated to provide a desired diffusion effect.

2. Description of Related Art

Light emitting diodes have a number of advantages over conventional lighting elements, including relatively low power consumption, the ability to emit light of different colors, and durability. However, because of the small size of LEDs, they cannot be used to provide wide area lighting of the type conventionally provided by fluorescent lights.

The present invention combines the conventional LEDs into a new type of lighting element, in which light from the individual LEDs is diffused through a microprism sheet to provide a lighting effect similar to that provided by a fluorescent light, and yet that is flexible and can therefore be formed into a wide variety of configurations, including tube-shaped structures capable of emulating a fluorescent light tube, without the relatively high power consumption of a conventional fluorescent light tube or the need for an electronic ballast. By using a microprism sheet to diffuse light emitted by the LEDs, the light is combined in a more uniform manner than is possible with conventional diffusers, which do not have the selective light bending properties of a microprism sheet.

The use of microprism sheets having light diffusing properties for purposes such as glare reduction overlays, rear or front projection screens, or light-diffusion screens of the type interposed between the back of an liquid crystal diode (LCD) screen and a light source, is of course well-known. Examples of prior microprism arrangements involving light diffusion are disclosed, for example, in U.S. Pat. No. 3,718,078 (Plummer), U.S. Pat. No 3,902,787 (Sherlock), U.S. Pat. No. 4,309,073 (Nishimura et al.), and U.S. Pat. No. 5,837,346 (Langille et al.). In general, however, in contrast to the present invention, the microprism sheet arrangements disclosed in these references use the diffusion properties to smooth out irregularities or hot spots with respect to light or images that are spread out over a relatively large area.

Additional examples of microprism sheets which may be provided with light diffusing properties are disclosed in copending U.S. patent application Ser. No. 09/481,942, filed Jan. 13, 2000, which discloses a number of microprism sheet treatment arrangements, in the context of privacy screens, interlacing arrangements and light separating arrangements, but not specifically for use in lighting elements.

On the other hand, a lighting arrangement involving use of microprism sheets in connection with "point sources"

such as LEDs is disclosed in U.S. Pat. No. 5,835,661 (Tai et al.). The system disclosed in this patent seeks "the conversion of light from a point-like light source to a linear or planar light beam having a sufficiently uniform distribution of light" by employing a light pipe combined with microprism structures which are used to divert light out of the light pipe over an extended surface. The lighting arrangement disclosed in U.S. Pat. No. 5,835,661 is said to be useable in displays, road signs, medical research equipment, instrument meters or jewelry, light pictures or art work, or for surgical or dental lighting, but nevertheless is disadvantageous because of its relative complexity and because the lighting elements disclosed in the patent is are limited to rigid rather than flexible structures. The present invention is intended to be suitable for use not only in the applications listed in U.S. Pat. No. 5,835,661, but also in a variety of additional lighting applications requiring more flexible, low power, wide area lighting.

SUMMARY OF THE INVENTION

It is accordingly a first objective of the invention to provide a lighting element having reduced power consumption and heat output, is available in a range of colors, and is lightweight, durable, and flexible.

It is a second objective of the invention to provide a lighting element made up of a plurality of point sources, and yet which provides an even, wide area lighting effect similar to that provided by a fluorescent lamp.

These objectives are achieved, in accordance with the principles of a preferred embodiment of the invention, by providing a lighting element in which the plurality of point sources are in the form of LEDs situated between a microprism sheet and a reflective backing structure, the microprism sheet being of the type having a plurality of v-shaped grooves and arranged to exhibit a diffusion effect. The LEDs are situated in the grooves of the microprism sheet so that light from the LEDs that is directly incident on walls of the grooves, and light that is reflected by the backing structure, is directed by refraction to exit the sheet in a uniform direction and diffused to provide an even lighting effect. While it is within the scope of the invention to utilize rigid microprism sheets, the ability to utilize conventional sheet made of cast resin or other flexible materials enables the production of flexible lighting elements which may, for example, be rolled up into tubes to provide tubular lighting elements, or made into flat or curved panels.

It will be appreciated by those skilled in the art that the manner in which the microprism sheets of the preferred embodiment of the invention are treated to obtain diffusion properties may be varied in numerous ways without departing from the scope of the invention, including the use of diffusion coatings, roughening or etching of surfaces of the microprism, and casting of materials with diffusion agents added to the material before solidification.

DETAILED DESCRIPTION OF THE PREFERRED EMBODIMENTS

Figure 1:
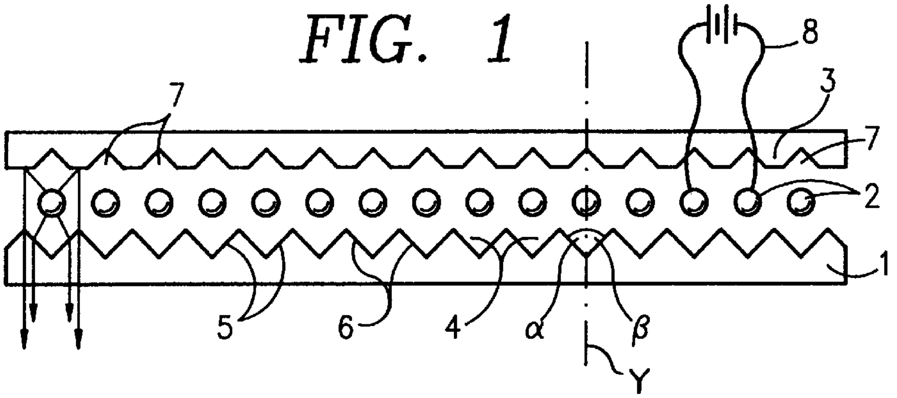
FIG. 1 is a side view of a lighting element arranged according to the principles of a preferred embodiment of the invention.

As shown in FIG. 1, the principal components of the lighting element of the preferred embodiment of the invention are a microprism sheet 1, a plurality of small point-like light sources such as LEDs 2 arranged to fit within grooves of the microprism sheet, and a reflective backing structure 3.

The microprism sheet 1, which is preferably of the type having v-shaped linear grooves 4 defined by surfaces 5 and 6 extending at respective angles $\alpha$ and $\beta$ relative to an axis Y transverse to the principal plane of sheet 1. Preferably, for purposes of the present invention, angles $\alpha$ and $\beta$ are equal, although it is possible that, for some purposes, different angles may be desired to create a preferred viewing angle.

Microprism sheet 1 may be of conventional construction and materials, so long as it has some light diffusing properties to reduce the visibility of the individual point sources and provide a more uniform lighting effect. Modification of surfaces of the microprism sheet to achieve light diffusion can be carried out by any of the methods described in the prior patents cited above, including coating the surfaces with a light diffusing material and casting irregularities into the surfaces, or modifying the surfaces by delustering, and/or chemical or laser etching. In the case of chemical or laser etching, surfaces may be caused to diffuse light by roughening, either by applying the chemical or directing the laser at the surface through an appropriate mask, or by etching the casting tool or die that forms the sheet. In addition, or alternatively, surfaces could originally cast a light diffusing finish, or a light diffusing compound could be dispersed into the material of the microprism sheet.

The pitch of the grooves will depend on the particular application, and in particular on the size of the LEDs to be situated therein. Typical acrylic microprism sheets can be cast with parallel grooves having a pitch of on the order of 0.1 to 0.25 inches, which is suitable for placement of LEDs therein. Depending on the depth of the LED placement relative to the front of the sheet, suitable angles can be chosen from anywhere from less than 30° to more than 60°.

Preferably, positioned behind the LEDs is a reflective structure arranged to reflect light back through the microprism sheet. The reflective structure can be planar or may itself include grooves 7, be formed with parabolic indentations, or otherwise shaped to reflect light back to the microprism sheet at an optimal angle. The reflective structure may be a coated resin sheet, a stamped and formed foil structure, or any other structure having a reflective surface which can be adhered to the microprism sheet.

The LEDs may be sandwiched between the microprism sheet and the reflective structure, adhered to the appropriate surfaces of the microprism sheet or reflective structure may and the LEDs and lead wires S for the LEDs (schematically shown in FIG. 1) optionally encapsulated. In case the LEDs are encapsulated in the grooves, the material encapsulating the LEDs may itself be shaped, polished, and/or coated to form the reflective structure. Alternatively, the LEDs may be mounted on a transparent flexible printed circuit board positioned between the microprism sheet and the reflective structure.

Figure 2A:
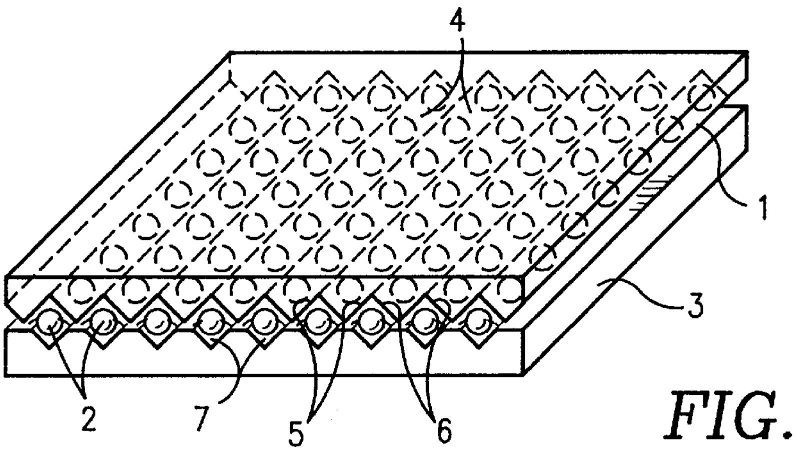
FIGS. 2A is an isometric view of a parallel groove configuration for the preferred lighting element illustrated in FIG. 1.
Figure 2B:
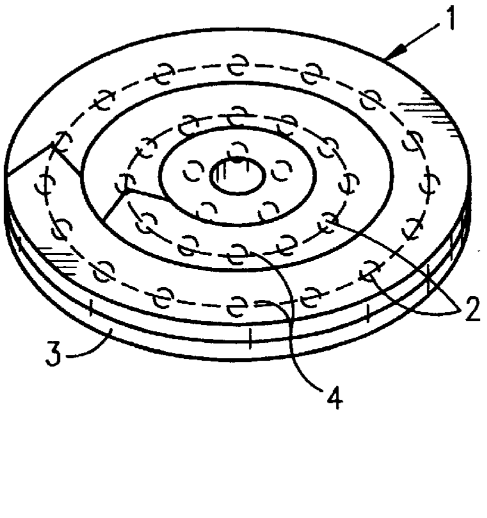
FIG. 2B is an isometric view of an alternative concentric groove configuration for the preferred lighting element illustrated in FIG. 1.

As shown in FIG. 2A, the v-shaped grooves may be arranged in a linear and parallel configuration, although those skilled in the art will recognize that it is also possible to provide a lighting element having grooves are arranged in concentric circles in the manner of a Fresnel lens, as shown in FIG. 2B, or in any other desired pattern.

Figure 3:
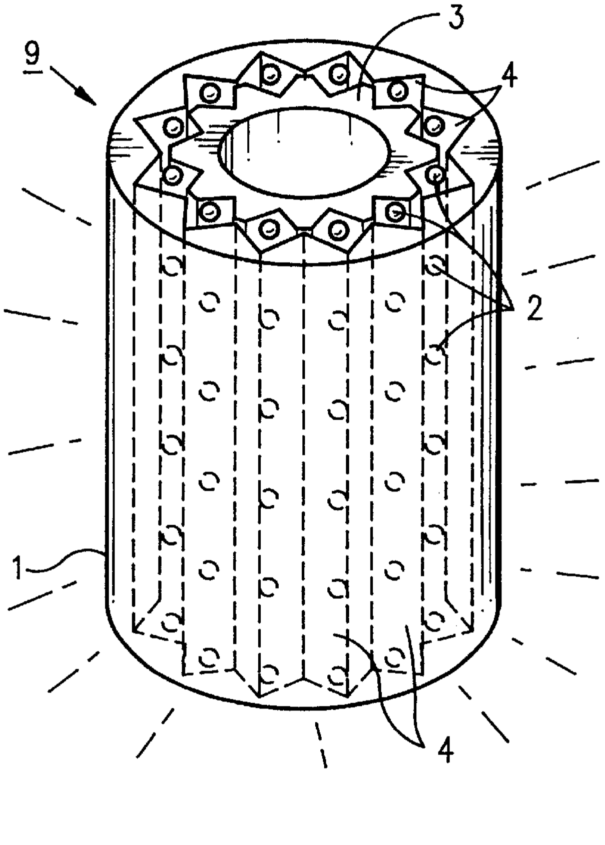
FIG. 3 is an is isometric view of the lighting element of FIGS. 1 and 2A, which has been wrapped to form a tubular lighting element.

As illustrated in FIG. 3, the microprism sheet of the preferred embodiment of the invention may be arranged into a variety of configurations, including a tubular lighting element 9 that resembles a fluorescent light, but with the advantages of simple control and low power consumption.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. Accordingly, it is intended that the invention not be limited by the above description or accompanying drawings, but that it be defined solely in accordance with the appended claims.

What is claimed is:

1. A lighting element comprising a microprism sheet including a plurality of grooves having a v-shaped cross-section, a plurality of discrete light sources positioned in each of at least two of said grooves, and a reflective structure for reflecting light from the discrete light sources back towards said microprism sheet.

2. A lighting element as claimed in claim 1, wherein said discrete light sources are light emitting diodes.

3. A lighting element as claimed in claim 1, wherein said microprism sheet exhibits a diffusion effect.

4. A lighting element as claimed in claim 3, wherein a surface of said microprism sheet is a coated surface, said coated surface having a property of diffusing light passing through the surface.

5. A lighting element as claimed in claim 3, wherein a surface of said microprism sheet is a light diffusing surface selected from the group consisting of a surface having cast irregularities, a delustered surface, and a surface that has been roughened by chemical or laser etching.

6. A lighting element as claimed in claim 3, wherein said microprism sheet is made of a material having light diffusion properties.

7. A lighting element as claimed in claim 1, wherein the microprism sheet and reflective structure are made of a flexible material.

8. A lighting element as claimed in claim 1, wherein said grooves are parallel linear grooves.

9. A lighting element as claimed in claim 1, wherein said grooves extend to form concentric circles.

10. A lighting element as claimed in claim 1, wherein the microprism sheet is folded to form a tubular structure.

* * * * *